(12) United States Patent
Snawerdt

(10) Patent No.: US 9,037,000 B2
(45) Date of Patent: May 19, 2015

(54) WAVE-DIVISION MULTIPLEXING TELECOMMUNICATIONS SYSTEM AND METHOD

(75) Inventor: Peter Snawerdt, Melbourne Beach, FL (US)

(73) Assignee: TQ GAMMA, LLC, Austin, TX (US)

( * ) Notice: Subject to any disclaimer, the term of this patent is extended or adjusted under 35 U.S.C. 154(b) by 1082 days.

(21) Appl. No.: 12/287,662

(22) Filed: Oct. 10, 2008

(65) Prior Publication Data

US 2009/0123164 A1    May 14, 2009

Related U.S. Application Data

(63) Continuation of application No. 09/809,936, filed on Mar. 16, 2001.

(51) Int. Cl.
*H04B 10/00* (2013.01)
*H04J 14/02* (2006.01)
*H04B 10/50* (2013.01)
*H04B 10/548* (2013.01)

(52) U.S. Cl.
CPC .............. *H04J 14/02* (2013.01); *H04B 10/505* (2013.01); *H04B 10/506* (2013.01); *H04B 10/548* (2013.01)

(58) Field of Classification Search
USPC ........................................................ 398/157
See application file for complete search history.

(56) References Cited

U.S. PATENT DOCUMENTS

| 36,430 | A | 12/1899 | Halbert-Lasalle et al. ... 370/204 |
| 4,479,266 | A | 10/1984 | Eumurian et al. |
| 4,709,415 | A | 11/1987 | Prisco |
| 4,754,452 | A | 6/1988 | Henry .............................. 370/85 |
| 4,824,201 | A | 4/1989 | Kazovsky |
| 4,933,929 | A | 6/1990 | Tajima ............................ 398/91 |
| 4,998,295 | A | 3/1991 | Siegel |
| 5,062,704 | A | 11/1991 | Bateman |
| 5,223,967 | A | 6/1993 | Udd ............................. 359/119 |
| 5,225,922 | A * | 7/1993 | Chraplyvy et al. ............. 398/94 |

(Continued)

FOREIGN PATENT DOCUMENTS

| DE | 19949401 | 9/2001 |
| EP | 0293 086 | 11/1988 |

(Continued)

OTHER PUBLICATIONS

Newton, Harry, Newton's Telecom Dictionary, Flatiron Publishing, incorporated, $8^{th}$ Edition, pp. 64, 544, 545.

(Continued)

*Primary Examiner* — Agustin Bello
(74) *Attorney, Agent, or Firm* — Jackson Walker L.L.P.

(57) ABSTRACT

A fiber optic data transmission system includes an optical fiber and a data transmitter having a first laser having a first wavelength, a first phase modulator for phase modulating light from the first laser as a function of a first data input stream so as to create a first phase-modulated output data stream, a second laser having a second wavelength different from the first wavelength, and a second phase modulator for phase modulating light from the second laser as a function of a second data input stream so as to create a second phase-modulated output data stream. The transmitter also includes a combiner combining the first and second output data streams into a phase-modulated optical signal for transmission over the optical fiber.

6 Claims, 3 Drawing Sheets

(56) References Cited

U.S. PATENT DOCUMENTS

| | | | |
|---|---|---|---|
| 5,239,306 A | 8/1993 | Siwiak et al. | 340/825.44 |
| 5,291,516 A | 3/1994 | Dixon et al. | 375/1 |
| 5,319,438 A | 6/1994 | Kiasaleh | |
| 5,452,086 A | 9/1995 | Bunn | |
| 5,455,698 A | 10/1995 | Udd | 359/119 |
| 5,479,539 A | 12/1995 | Goldsmith et al. | |
| 5,483,370 A | 1/1996 | Takahashi | |
| 5,539,560 A | 7/1996 | Dennis et al. | |
| 5,543,952 A | 8/1996 | Yonenaga et al. | 359/181 |
| 5,561,727 A | 10/1996 | Akita et al. | |
| 5,572,350 A | 11/1996 | Spanke | |
| 5,577,087 A | 11/1996 | Furuya | |
| 5,606,446 A | 2/1997 | Davis et al. | 359/173 |
| 5,623,355 A * | 4/1997 | Olsen | 398/162 |
| 5,625,479 A | 4/1997 | Suzuki et al. | |
| 5,680,234 A | 10/1997 | Darcie et al. | |
| 5,726,784 A | 3/1998 | Alexander et al. | 359/125 |
| 5,745,613 A | 4/1998 | Fukuchi et al. | 385/24 |
| 5,757,912 A | 5/1998 | Blow | 380/21 |
| 5,771,442 A | 6/1998 | Wang et al. | |
| 5,793,512 A | 8/1998 | Ryu | 359/179 |
| 5,825,949 A | 10/1998 | Choy et al. | |
| 5,896,211 A | 4/1999 | Watanabe | 359/124 |
| 5,903,375 A | 5/1999 | Horiuchi et al. | |
| 5,907,417 A | 5/1999 | Darcie et al. | |
| 5,917,637 A * | 6/1999 | Ishikawa et al. | 398/197 |
| 5,920,416 A | 7/1999 | Beylat et al. | 359/181 |
| 5,923,451 A | 7/1999 | Karstensen et al. | |
| 5,940,452 A | 8/1999 | Rich | 375/347 |
| 5,946,119 A | 8/1999 | Bergano et al. | 359/124 |
| 5,953,139 A | 9/1999 | Nemecek et al. | |
| 5,953,421 A | 9/1999 | Townsend | |
| 6,005,694 A | 12/1999 | Liu | |
| 6,072,615 A | 6/2000 | Mamyshev | 359/183 |
| 6,097,525 A * | 8/2000 | Ono et al. | 398/185 |
| 6,122,086 A | 9/2000 | Djupsjoebacka | |
| 6,124,960 A | 9/2000 | Garthe et al. | 359/181 |
| 6,201,632 B1 | 3/2001 | Rollins | |
| 6,215,565 B1 | 4/2001 | Davis et al. | |
| 6,243,505 B1 | 6/2001 | Bosso et al. | 385/2 |
| 6,256,130 B1 | 7/2001 | Bülow | 359/173 |
| 6,271,950 B1 | 8/2001 | Hansen et al. | |
| 6,285,548 B1 | 9/2001 | Hamlel et al. | |
| 6,307,659 B1 | 10/2001 | Gilliland et al. | |
| 6,335,814 B1 | 1/2002 | Fuse et al. | |
| 6,362,908 B1 | 3/2002 | Kimbrough et al. | |
| 6,396,605 B1 | 5/2002 | Heflinger et al. | |
| 6,404,528 B1 | 6/2002 | Pfeiffer | 359/189 |
| 6,469,816 B1 | 10/2002 | Snawerdt | |
| 6,476,952 B1 | 11/2002 | Snawerdt | |
| 6,515,777 B1 | 2/2003 | Arnold et al. | |
| 6,529,316 B1 | 3/2003 | Treyz et al. | |
| 6,549,311 B1 * | 4/2003 | Hakki et al. | 398/79 |
| 6,594,055 B2 | 7/2003 | Snawerdt | 359/173 |
| 6,643,046 B2 | 11/2003 | Ibe et al. | |
| 6,665,500 B2 | 12/2003 | Snawerdt | |
| 6,690,890 B1 | 2/2004 | Udd et al. | |
| 6,738,584 B1 * | 5/2004 | Tsuda et al. | 398/147 |
| 6,819,849 B1 * | 11/2004 | Tangonan et al. | 385/126 |
| 6,842,236 B1 | 1/2005 | Deutsch | |
| 6,990,296 B2 | 1/2006 | Choudhary et al. | |
| 7,035,543 B1 | 4/2006 | Hoshida et al. | |
| 7,099,592 B2 | 8/2006 | Snawerdt | |
| 7,200,344 B1 | 4/2007 | Hoshida | |
| 2002/0131106 A1 | 9/2002 | Snawerdt | 359/124 |
| 2002/0196501 A1 | 12/2002 | Buss et al. | |

FOREIGN PATENT DOCUMENTS

| | | |
|---|---|---|
| EP | 0977382 | 2/2000 |
| FR | 2637432 | 4/1990 |
| JP | 060539-04 | 2/1994 |

OTHER PUBLICATIONS

Cloud, Gary, Optical Methods in Experimental Mechanics, Experimental Techniques, Jul./Aug. 2002, pp. 13-15.

Technical Note, Lithium Niobate Intesity (Amplitude) Modulator, AT&T Microelectronics, Mar. 1995, pp. 1-20.

Definition "amplitude modulation (AM)" www.its.bldrdoc.gov.

www.fotec.com/oldrkit.htm 'Fiber U PC-based OTDR' 1998-2000, Fotec, Inc.

www.youthcom.com/product.instrument/anritsu/mw9076.htm 'MW9076 series mini-OTDR' 1998-2000.

Newbridge 3600 MainStreet Family Preinstallation Guide section 10.3 et seq., Mar. 1998, 26 pages.

STM/S Release 4.0 Documentation, printed from Internet Jan. 17, 2001, date unknown, 21 pages.

"Amplitude Intensity Modulation (AIM)." Definition, Institute for Telecomm. Sciences. www.its.bldrdoc.gov. Accessed Sep. 3, 2003.

Swanson et al.:"High Sensitivity Optically Preamplified Direct Detection DPSK Receiver with Active Delay-Line Stabilization," IEEE Photonics Technology Letters, vol. 6, No. 2, Feb. 2004.

Atia et al.:"Demonstration of Return-to-Zero Signaling in Both OOK and DPSK Formats to Improve Receiver Sensitivity in an Optically Preamplified Receiver," Lincoln Laboratory, Massachusetts Institute of Technology, 1999, pp. 226-227.

"LiNbO3 Optical Modulators," Operation Manual, Sumitomo Osaka Cement Co., Ltd. Version 1.0, Dec. 13, 1996, 10 pages.

"SHF 4001 MUX 40 GBit/s Multiplexer," SHF Design, Feb. 15, 1999, 4 pages.

Terumi Chikama et al.: "Modulation and Demodulation Techniques in Optical Heterodyne PSK Transmission Systems," Journal of Lightwave Technology, vol. 8, No. 3, Mar. 1990, 309-322.

* cited by examiner

WAVE-DIVISION MULTIPLEXING TELECOMMUNICATIONS SYSTEM AND METHOD

CROSS REFERENCE TO RELATED APPLICATION

This application is a continuation of U.S. patent application Ser. No. 09/809,936, filed Mar. 16, 2001, the entire text of which is hereby incorporated by reference herein.

BACKGROUND OF THE INVENTION

The present invention relates generally to telecommunications and more particularly to improving data transmission over wave-division multiplexed fiber optic networks.

In current fiber optic networks, an electronic data stream is fed to a laser amplitude modulator. The laser amplitude modulator typically pulses or alters the laser output to create an amplitude-modulated optical signal representative of the electronic data stream. The laser amplitude modulator and laser thus define a transmitter for transmitting the optical signal over an optical fiber, which is then received by a receiver. The receiver for the amplitude-modulated optical signals of the optical data typically includes a photodiode to convert the optical signals back into the electronic data stream.

The reading of the amplitude-modulated optical data signals using a photodiode is straightforward: the optical signals either produce an electric output at the photodiode or they do not. As a result, an output electronic data stream of zeros and ones is generated.

However, optical fiber may be tapped. The optical fibers can be spliced or even merely clamped so as to obtain optical signals from the fiber. It also may be possible to tap fibers without physically touching the optical fiber, for example by reading energy emanating or dissipating along the fiber. Amplitude-modulated optical signals, with their ease of detection from a photodiode, require that only a small amount of energy be tapped and passed through the photodiode in order to be converted into a tapped electronic data stream.

To confront non-secure optical and non-optical data lines, it has been known to use public key/private key encryption so that the data stream being transmitted is encoded in a format that makes it difficult to decode. Encryption however has several drawbacks, including the need for extra processing steps and time. Moreover, public key/private key encrypted data can be cracked, and the devices and algorithms for doing so are constantly improving.

U.S. Pat. No. 5,455,698 purports to disclose a secure fiber optic communications system based on the principles of a Sagnac interferometer. A data transmitter is a phase modulator for modulating counter-propagating light beams sent by a receiver round a loop. The receiver includes a light source, a beamsplitter for splitting light from the light source into counter-propagating light beams and for receiving the phase-modulated light beams, and an output detector. U.S. Pat. No. 5,223,967 describes a similar Sagnac-interferometer-based system operating over a single optical fiber.

The Sagnac-interferometer-based systems described in these patents have the disadvantage that they require the light to travel over a loop, whether back and forth in a single fiber or over a long length looped fiber. As a result, either the link budget for the single fiber must be doubled, reducing the data carrying capacity for a single fiber, or else a looped fiber with significant and expensive extra length of at least twice that of a single fiber must be laid between the transmitter and the receiver. Moreover, the receiver contains the light source, as opposed to the current installed base where the transmitter has the light source.

The Sagnac-interferometer-based systems thus are expensive to build and operate, and do not work particularly well with existing systems. Moreover, because a broadband light source is desired for Sagnac-intereferometer based systems (see U.S. Pat. No. 5,455,698 patent at col 1, lines 66 et seq.), these systems do not work well with wavelength division multiplexed (WDM) systems in which data is transmitted over different wavelengths. The U.S. Pat. No. 5,455,698 patent describes splitting a wavelength division multiplexed system with three different wavelengths. However, two of the waevelengths are guard bands strictly used for alarm detection and not for information transmitting. See, e.g., the '698 patent at col. 13, lines 44-55.

U.S. Pat. No. 6,072,615 purports to describe a method for generating a return-to-zero optical pulses using a phase modulator and optical filter. The RZ-pulse optical signal transmitted over the fiber is easily readable by a detector.

U.S. Pat. No. 5,606,446 purports to describe an optical telecommunications system employing multiple phase-compensated optical signals. Multiple interferometric systems are combined for the purpose of multiplexing various payloads on the same optical transmission path. The patent attempts to describe a method for providing fiber usage diversity using optical coherence length properties and a complex transmit/receive system. Each transmitter has a splitter, a plurality of fibers and a plurality of phase modulators to create the multiplexed signal, which is then demultiplexed at the receiver. This system is complex and expensive.

U.S. Pat. No. 5,726,784 purports to describe a WDM optical communications system with remodulators and diverse optical transmitters. An external modulator is used to impart an amplitude-modulated output signal for each wavelength, as described in column 6, lines 14 to 36 of the '784 patent. Optoelectronic detectors can easily read these amplitude-modulated signals. The entirety of U.S. Pat. No. 5,726,784 is hereby incorporated-by-reference herein.

SUMMARY OF THE INVENTION

An object of the present invention is to provide an improved security WDM transmission system and device. Yet another alternate or additional object of the present invention is to provide a simple yet secure phase-modulated optical data transmission system usable in a WDM system.

The present invention provides a fiber optic data transmission system comprising a transmitter having a first laser having a first wavelength, a first phase modulator for phase modulating light from the first laser as a function of a first data input stream so as to create a first phase-modulated output data stream, a second laser having a second wavelength different from the first wavelength, and a second phase modulator for phase modulating light from the second laser as a function of a second data input stream so as to create a second phase-modulated output data stream. A combiner combines the first and second output data streams into a phase-modulated optical signal, which is transmitted over an optical fiber.

Preferably, a controller controls the first phase modulator as a function of an output of a delayed-feedback exclusive-or gate having the first input data stream as an input, as described in co-owned U.S. Pat. No. 6,594,055, entitled "Secure Fiber Optics Telecommunications System and Method" and filed on Jan. 17, 2001, the entire disclosure of which is hereby incorporated by reference herein. The controller also preferable controls the second phase modulator as a function of an output of another delayed-feedback exclusive-or gate.

The present system also includes a receiver receiving the optical signal from the optical fiber. The receiver includes a WDM/DWDM splitter for splitting the optical signal into a first path with the first wavelength and a second path with the second wavelength. A first delayed-arm interferometer receives the first path and a second delayed-arm intereferometer receives the second path. The interferometers may be similar to those described in incorporated-by-reference U.S. Pat. No. 6,594,055, entitled "Secure Fiber Optics Telecommunications System and Method" and filed on Jan. 17, 2001.

The first laser preferably is a continuous wave laser, for example a semiconductor laser operating at 1550.92 nm, with the second laser being for example a continuous wave semiconductor laser operating at 1546.12 nm. However, other wavelengths are possible.

The receiver may include detectors for converting the output optical signals from the interferometers into electronic output data streams. Filters may be provided to reduce any noise at the output signal.

The system preferably includes a detector for detecting a tap or loss of energy in the optical fiber. Most preferably, the detector is an energy sensor, which may or may not include programmable "trip" levels, which can monitor the amplitude of the light in the fiber. If a tap occurs, it must couple off a significant amount of energy to pass through an interferometer with a low bit error rate, thus making detection of the tap by the detector highly likely. The energy detector preferably is located upstream from the WDM/DWDM splitter.

Depolarizers preferably are located between the lasers and the respective phase modulators, and in one arm of the interferometers of the receiver.

The present invention also provides a transmitter comprising a first laser having a first wavelength, a first phase modulator for phase modulating light from the first laser so as to form a phase-modulated first optical data stream, a second laser having a second wavelength different from the first wavelength, a second phase modulator for phase modulating light from the second laser so as to form a phase-modulated second optical data stream, a combiner for combining the phase-modulated first and second optical data streams, and a controller controlling the first and second phase modulators as function of a first input electronic data stream and a second input electronic data stream. The controller preferably includes a first delayed-feedback exclusive-or gate and a second delayed-feedback exclusive-or gate.

In addition, the present invention also provides a receiver comprising an optical splitter for splitting light into a first wavelength and a second wavelength different from the first wavelength, and a first interferometer receiving light at the first wavelength and a second interferometer receiving light at the second wavelength.

The optical WDM/DWDM splitter preferably includes a Bragg grating.

A method for transmitting secure data is also provided comprising the steps of: transmitting light from a first laser at a data transmitter; phase modulating light from the first laser at the data transmitter as a function of a first electronic data input stream; transmitting light from a second laser having a wavelength different from the first laser; phase modulating light from the second laser at the data transmitter as a function of a second electronic data input stream; and combining light from the first and second lasers so as to create a combined output signal with phase-modulated data.

Preferably, the phase modulated data is a function of outputs of delayed-feedback exclusive-or gates. Preferably, all of the light from the first and second lasers is phase-modulated.

The method further may include receiving the phase-modulated combined optical signal in a receiver, and splitting the combined output signal into a first and second path as a function of wavelength. The first and second paths are then each passed through an interferometer.

The method preferably includes monitoring a fiber for intrusion. The monitoring preferably includes monitoring an energy level in the fiber with programmable trip levels.

While the invention has been described with two different wavelength lasers, more lasers are of course possible.

BRIEF DESCRIPTION OF THE DRAWINGS

A preferred embodiment of the present invention is described below by reference to the following drawings, in which.

DETAILED DESCRIPTION

Figure 1:
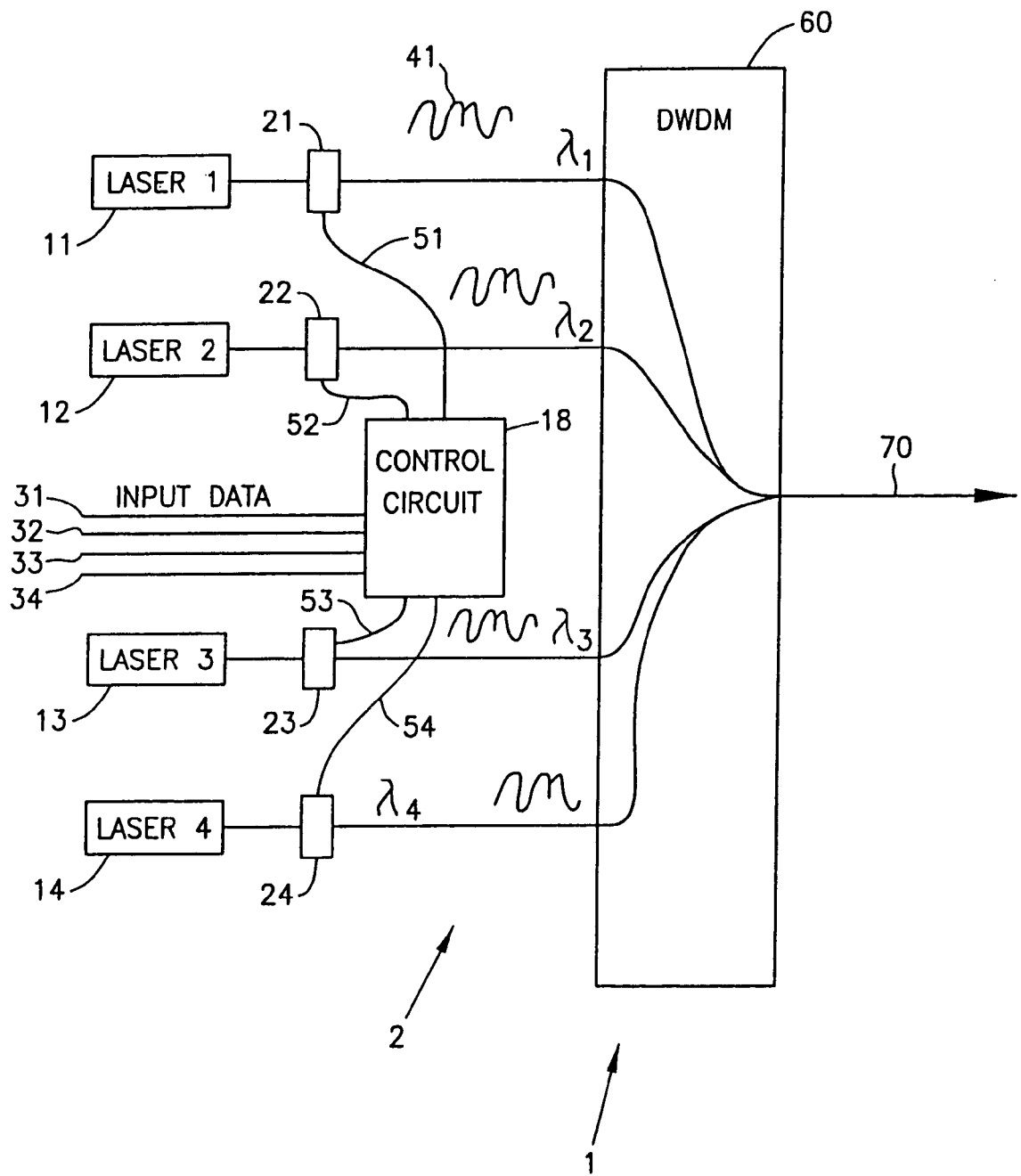
FIG. 1 shows a transmitter of the present invention.
Figure 2:
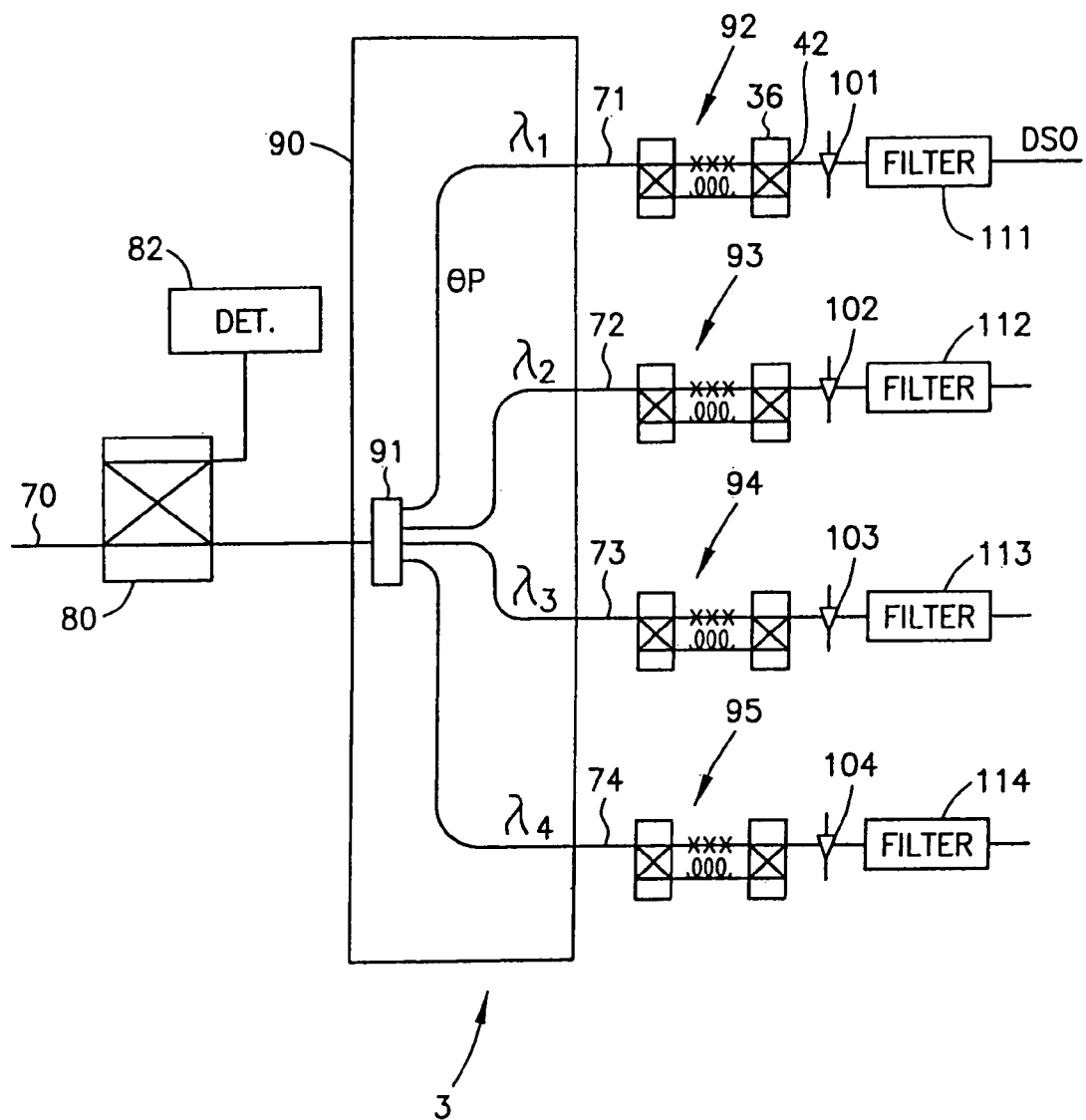
FIG. 2 shows a receiver of the present invention.

FIG. 1 shows a preferred embodiment of a secure telecommunications system 1 with wave division multiplexing according to the present invention. The system 1 includes a transmitter 2 with continuous wave coherent lasers 11, 12, 13 and 14, each for example a semiconductor laser emitting a narrow band of light at 1557 nm, 1554 nm, 1551 nm and 1548 nm, respectively. Other wavelengths however are possible. Light emitted from lasers 11, 12, 13, 14 is depolarized and then passes through phase modulators 21, 22, 23, 24, respectively, each for example a Mach-Zender phase modulator. An electronic controller 18 controls phase modulators 21, 22, 23, 24 as a function of four input electronic data streams 31, 32, 33, 34, respectively. Controller 18 is also programmable to control the optical power output of light emitted by lasers 11, 12, 13, 14. Preferably, the power output of the lasers is set as low as possible for a given optical span, while maintaining a low bit error rate. This reduces the light available for any tap.

Depending on the binary output 51 of controller 18, phase modulator 21 either imparts a first phase shift to the light (for example, zero) or a second phase shift different from the first phase shift (for example, 180 degrees) on the light passing through phase modulator 21, thus creating a phase-modulated optical signal 41, which represents a stream of binary bits. The first phase shift for example represents a binary zero and the second phase shift a binary one. Likewise, phase modulators 22, 23, 24, as a function of outputs 52, 53, 54 of controller 18 respectively, impart a first phase shift or second phase shift on light from lasers 12, 13, 14, respectively. Thus independent data streams 41, 42, 43, 44 are created.

Figure 3:
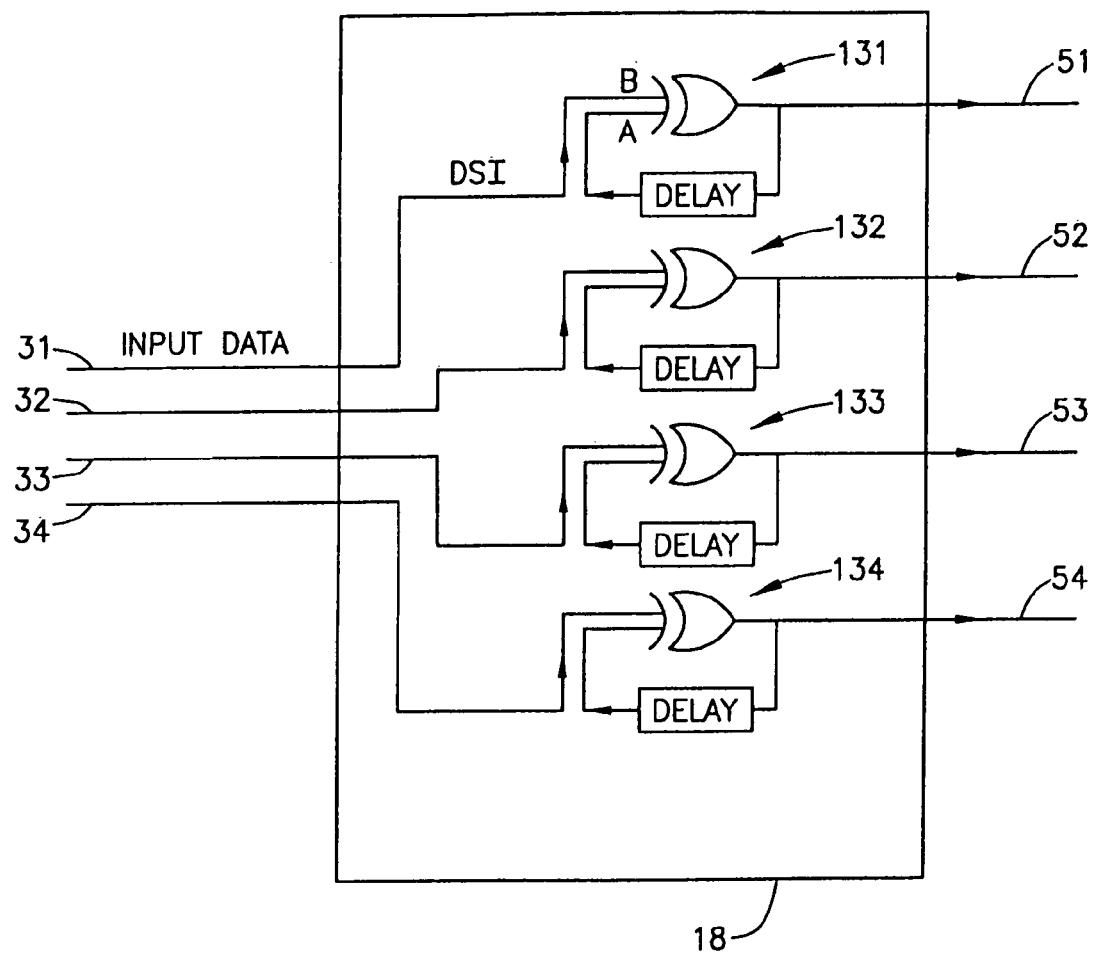
FIG. 3 shows details of the control system of FIG. 1.

FIG. 3 shows a respresentation of the control circuit of controller 18. Each input electronic data stream 31, 32, 33, 34 is fed through a delayed-feedback exclusive-or gate 131, 132, 133, 134, respectively. Each feedback delay of each gate 131, 132, 133, 134 may equal, for example, a number of bits. The feedback delays may be the same or, preferably, differ among the gates 131, 132, 133, 134. The binary output streams 51, 52, 53, 54 are used to phase modulate the light from lasers 11, 12, 13, 14, respectively, to create the phase-modulated optical data streams 41, 42, 43, 44.

Optical data streams 41, 42, 43, 44 are combined in a combiner 60 which combines the light at the different wavelengths and sends it over a fiber 70.

Light from fiber 70 is received in a receiver 3 according to the present invention. A splitter 80 splits off a portion of the light, directing part of the optical energy to the light monitoring detector 82 and passing the remaining light to a wave division splitter 90 preferably having a Bragg grating 91.

A detector 82, for example a light energy detector, monitors the light energy in the fiber 70 via the light energy coupled to the detector by splitter 80, the light energy being a function of the amplitude. If the amplitude drops, most likely from a tap, the detector alerts the receiver and can, for example, sound an alarm or alert network maintenance personnel. Additionally, since the receiver 3 is generally part of a component box, which also includes a transmitter, the component box transmitter can send a signal back to the component box containing transmitter 2 so as to instruct transmitter 2 to stop sending data, or to send data over a standby fiber. Detector 82, while preferably part of receiver 3, also could be located separately from receiver 3, for example where fiber 70 enters a building or other secure environment.

WDM splitter 90 splits the light into the four wavelengths originally sent by lasers 11, 12, 13 and 14 to paths 71, 72, 73, 74. Each path 71, 72, 73, 74 enters a delayed-arm interferometer 92, 93, 94, 95. The delay loop of each interferometer 92, 93, 94, 95 corresponds to the electronic feedback delay in each of the circuits 131, 132, 133, 133, respectively.

The phase-modulated data as it passes through the respective interferometer 92, 93, 94, 95 either constructively interferes or destructively interferes so as to create signals read by detectors 101, 102, 103, 104, the signals being representative of input data 31, 32, 33, 34, respectively. This process is described in more detail in incorporated-by-reference U.S. Pat. No. 6,594,055, entitled "Secure Fiber Optics Telecommunications System and Method" and filed on Jan. 17, 2001.

Filters 111, 112, 113 and 114 are provided to compensate for any slight mismatch between the optical delay in the interferometer and the electronic delay, and for other noise.

System 1 provides a secure method for transmitting multiple streams of data over a single optical fiber, which is difficult to decode if tapped, and also permits excellent detection of the existence of a tap.

What is claimed is:

1. A method for transmitting data over optical fiber comprising the steps of:
    transmitting light at a first wavelength via a first laser;
    phase modulating light at the first wavelength at a data transmitter as a function of a first electronic data input stream so as to create a first output data stream, a first binary bit being represented by a first phase and a second binary bit being represented by a second phase different from the first phase;
    transmitting light at a second wavelength different from the first wavelength;
    phase modulating light at the second wavelength at the data transmitter as a function of a second electronic data input stream so as to create a second output data stream;
    combining the first and second output data streams; and
    lowering a power output of the first laser via a controller as a function of a bit error rate;
    wherein the phase modulating of the first wavelength is a function of outputs of delayed-feedback exclusive-or gates.

2. The method as recited in claim 1 wherein all of the light from the first laser is phase-modulated.

3. The method as recited in claim 1 further including receiving the phase-modulated combined output data streams in a receiver, and splitting the combined output data stream into a first path at the first wavelength and the second path at the second wavelength.

4. The method as recited in claim 3 further comprising passing each of the first and second paths through an interferometer.

5. The method as recited in claim 1 further including monitoring the power to detect an intrusion.

6. The method as recited in claim 1 further comprising maintaining a bit error rate while performing the lowering of the power output.

* * * * *